No. 626,324. Patented June 6, 1899.
C. K. HARDING.
ACETYLENE GAS GENERATOR AND LAMP.
(Application filed Mar. 15, 1897.)
(No Model.) 2 Sheets—Sheet 1.
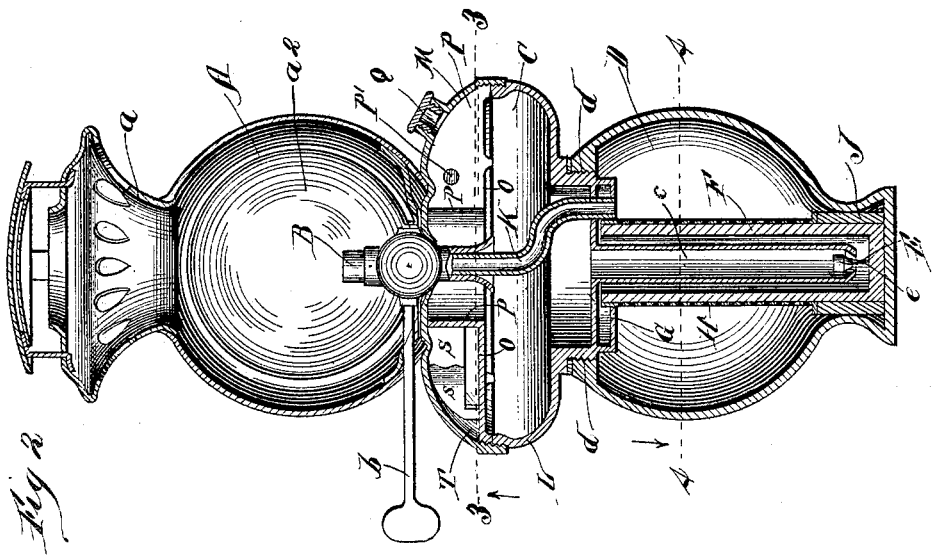
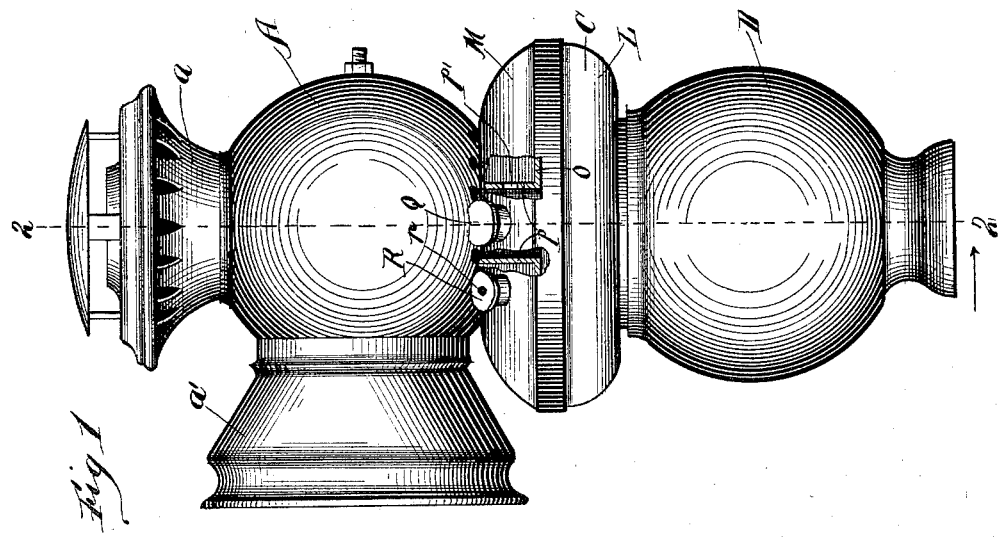
Witnesses
W. C. Coolies
C. H. Crawford
Inventor
Charles Knox Harding
By Louis K. Gleeson
Atty.

No. 626,324. Patented June 6, 1899.
C. K. HARDING.
ACETYLENE GAS GENERATOR AND LAMP.
(Application filed Mar. 15, 1897.)
(No Model.) 2 Sheets—Sheet 2.
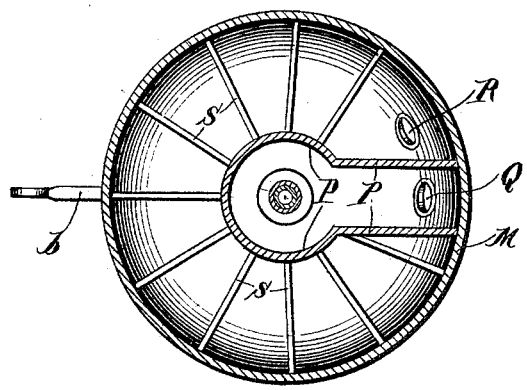
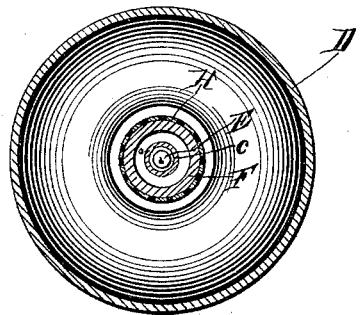
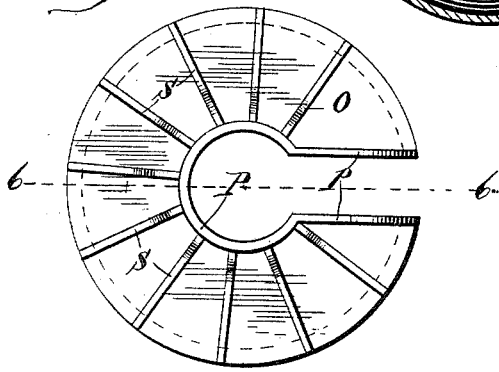
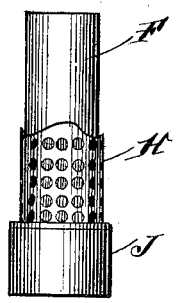
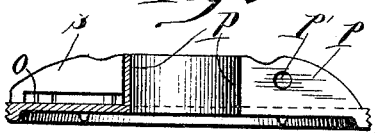
Witnesses
W. C. Corlies
C. H. Crawford
Inventor
Charles Knox Harding
By Louis K. Gillson
Atty.

UNITED STATES PATENT OFFICE.

CHARLES KNOX HARDING, OF CHICAGO, ILLINOIS, ASSIGNOR OF ONE-HALF TO SIMON H. LEVY, OF SAME PLACE.

ACETYLENE-GAS GENERATOR AND LAMP.

SPECIFICATION forming part of Letters Patent No. 626,324, dated June 6, 1899.

Application filed March 15, 1897. Serial No. 627,708. (No model.)

*To all whom it may concern:*

Be it known that I, CHARLES KNOX HARDING, a citizen of the United States, residing at Chicago, in the county of Cook and State of Illinois, have invented certain new and useful Improvements in Acetylene-Gas Generators and Lamps; and I do declare the following to be a full, clear, and exact description of the invention, such as will enable others skilled in the art to which it appertains to make and use the same, reference being had to the accompanying drawings, and to the letters of reference marked thereon, which form a part of this specification.

The objects of this invention are to secure sensitive regulation of the water-feed to a generating-chamber adapted for the generation of acetylene gas by decomposition of a carbid, such as calcium carbid, and water and to provide means for the absorption of the gas when an excess of pressure is developed, particularly for the absorption of the gas generated in connection with a small lamp, such as a bicycle or hand lamp, after the flame has been extinguished. In accomplishing these purposes a tube is employed to lead the water from the water-chamber to the bottom of the generating-chamber, and this tube is trapped by inclosing its discharge end within a porous cup, through the walls of which the water seeps slowly into the generating-chamber, and consequently comes in contact with the carbid. The porous cup may or may not be open at its upper end, and in either event the development of a gas-pressure within the generating-chamber tends to force back the water within the cup and to reduce the quantity delivered through its walls by reducing the area thereof through which the water is percolating.

The second object is accomplished by storing within a suitable chamber a quantity of material which has a marked tendency to absorb the gas and great capacity as an absorbent. This material is preferably stored in a chamber above the water-chamber, and the gas gains access to it by forcing the water back in the trap until the latter is empty and then passing upwardly in the water-chamber. This construction is preferred for the reason that the water itself has a large capacity as an absorbent of gas, and hence so much of the gas as is held thereby is not lost, but is yielded up when the lamp is again put into operation and as the water is delivered to the generating-chamber. It is advisable also to vent the chamber containing the absorbent material, so that if the generation of gas continues beyond the capacity of the absorbent to take care of it the excess may escape and an explosion be avoided. It is believed, however, that the water-regulating device will always prevent such an undue development of gas after the light has been extinguished, and this venting is a mere precaution against the accidental failure of the generator to operate as intended.

In the accompanying drawings there is shown not only a generator but a lamp attached thereto, for the reason that usually the device forming the subject of this application will be employed only in connection with small lamps.

Figure 1 is a side elevation of the lamp and its generator, partly broken away. Fig. 2 is a sectional view on the line 2 2 of Fig. 1. Fig. 3 is an inverted plan, partly in section, on the line 3 3 of Fig. 2. Fig. 4 is a sectional view on the line 4 4 of Fig. 2. Fig. 5 is a plan view of the floor and inner partition-wall of the chamber adapted to contain the gas-absorbent. Fig. 6 is a side elevation of the same, and Fig. 7 is a detail elevation of the trap.

The globe or shell of the flame-chamber of a bicycle-lamp is shown at A, its ventilating-dome at $a$, its light-emitting lens-holding tube at $a'$, and its reflector at $a^2$. The burner is shown at B, and at $b$ is indicated the stem of the valve for controlling the gas-service to the burner. The gas-globe is mounted immediately above the water-chamber C, and the generating-chamber D is directly below the water-chamber, the two casings of these chambers being in screw-threaded engagement, as indicated at $d$, so that when they are disconnected the generating-chamber is open for the admission of the charge of carbid.

The tube $c$ leads downwardly from the bottom of the water-chamber almost to the bottom of the generating-chamber. Its lower end is somewhat contracted, as plainly shown in Fig. 2, and within this end is fitted a loose plug-valve E, having a downwardly-projecting stem e, so that normally the valve is closed by gravity, and hence when the generating-chamber is detached the valve prevents the escape of water. The tube c is inclosed within a porous cup or cylinder F, which rests upon the bottom of the casing of the chamber D and extends well to the top of that chamber. The upper end of this casing may be open, as shown, or it may be closed. If open, it preferably enters an overflow-chamber G, formed as a part of the casing of the water-chamber C and adapted to receive water which may be spilled from the cup F by the accidental tipping of the lamp and hold it until it reënters the cup. This cup F is made of any suitable material, such as tripoli, and is without surface glazing. Means should be provided for holding the cup in a vertical position. As shown, this is accomplished by contracting the lower portion of the chamber D and setting the cup within a bushing J, fitted within this contracted portion, which bushing may be of any soft material, such as cork. That portion of the cup F which projects above the bushing J is preferably inclosed within a perforated shell H, so as to prevent the carbid from coming directly into contact with it.

In use the water seeps through the walls of the cup F and comes into contact with the carbid. Necessarily the discharge is greatest at the lower portion of the cup, diminishing gradually toward its top. As pressure is developed within the chamber D the gas enters the cup and lowers the level of the water by forcing it back in the tube c, thereby reducing the area of surface from which there is a discharge of water into the generating-chamber. When the pressure exceeds the weight of the column of water, it completely empties the cup, and further generation is prevented until the pressure is reduced.

The horizontal diameter of the chamber C is preferably as great as the size and style of the lamp will permit in order that there may be as little variation as possible in the height of the water-column entering the generating-chamber.

The shell of the water-chamber C is comprised of a lower and an upper section L M, the two being screwed together. A horizontal shelf O extends inwardly from the screw-threaded portion of section M and is preferably held in engagement with the same by being itself screw-threaded, so that it may be turned into its desired position before the section M is screwed onto section L. The shelf O extends almost entirely around the water-chamber C, space being left, however, for the filling-tube Q, by means of which water may be introduced into the chamber C. The inner edge of the shelf O is turned upward to form a flange or partition P, reaching to the top of section M of the case of the water-chamber, and its ends are turned upwardly in like manner, as indicated at $p\ p$, so that a chamber T is formed, its walls comprising the shelf O, the partitions P $p$, and the case M. One of the partitions $p$ is ported, as indicated at $p'$ and a filling-plug R is set in the casing M, adjacent to the other partition $p$, so as to provide an opening to the chamber T. A vent is provided for the chamber T and preferably by perforating the plug R, as indicated at $r$. Baffle-plates S S are set across the chamber T, extending downwardly from its top or being otherwise arranged, as may be desired. This chamber is intended to receive a quantity of chlorid of copper and ammonia or other chemical which is capable of and has a tendency to absorb and hold a considerable volume of gas. This material may be inserted by removing the plug R, and the casing is made sectional, as shown, so that the parts may be readily separated for the purpose of cleaning it.

When an excess of gas is developed, so that the water is forced back of the cup F, the gas passes upwardly through the tube c into the water-chamber and finds its way through the port $p'$ into the chamber T, and passing through the absorbent material is held thereby until the material becomes completely saturated. Should the generation of gas continue beyond this point, the excess beyond the capacity of the absorbent material to hold escapes through the vent $r$. The chamber T should be entirely filled with the absorbent material; but the baffle-plates S S are introduced in order that the gas may be forced through the chemical should it not entirely fill the chamber.

It will be readily seen that an absorbent material can be applied in a variety of ways for the purpose of taking up the excess of gas generated, and I do not desire to be limited to the particular means shown and herein described for providing an absorbent device of this character, as I believe that I am the first to propose the use of an absorbent for the purpose of relieving the excess of pressure in an acetylene-gas generator without making it necessary to discharge such excess into the apartment unless it should become very great, a contingency which is very unlikely to arise if a suitable water-regulating device is employed.

Gas is served to the burner B from the generating-chamber D by means of the tube K.

I claim as my invention—

1. In an acetylene-gas generator the combination with a water-chamber, and a generating-chamber below the water-chamber, of a tube leading from the water-chamber to the generating-chamber, the lower end of the tube being trapped and the walls of the trap being of porous material.

2. In an acetylene-gas generator the combination with a water-chamber, a generating-chamber below the water-chamber and a tube leading from the water-chamber to the generating-chamber, of a cylinder of porous material inclosing the tube and having its lower end closed, the tube terminating approximately at the bottom of the cylinder and being of less external diameter than its bore.

3. In an acetylene-gas generator the combination with a water-chamber, a generating-chamber below the water-chamber and a tube leading from the water-chamber to the generating-chamber, of a cylinder of porous material inclosing the tube and having its lower end closed, and an overflow-chamber at the top of the cylinder.

4. The combination with an acetylene-gas generator, a gas-burner, a duct leading directly from the generator to the burner, and a valve for controlling such duct, of a receptacle, a gas-absorbent within such receptacle, connection between the generator and the receptacle, and means for cutting off such connection when the gas has ample exit at the burner and for opening such connection when the duct leading to the burner is closed.

5. The combination with an acetylene-gas generator comprising a generating-chamber, a water-chamber above the generating-chamber and a trapped duct leading from the water-chamber to the generating-chamber, of a gas-overflow chamber open to the water-chamber above the water-level, and a gas-absorbent within such overflow-chamber.

6. The combination with a gas-lamp, an acetylene-gas generator comprising a generating-chamber, a water-chamber above the generating-chamber, and a trapped duct leading from the water-chamber to the generating-chamber, and with a valve-controlled duct leading from the generating-chamber to the lamp, of a gas-overflow chamber in communication with the water-chamber above the water-level, and a gas-absorbent within such chamber.

7. The combination with a gas-lamp, an acetylene-gas generator comprising a generating-chamber, a water-chamber above the generating-chamber, and a trapped duct leading from the water-chamber to the generating-chamber, and with a valve-controlled duct leading from the generating-chamber to the lamp, of a gas-overflow chamber in communication with the water-chamber above the water-level, and having a vent remote from its means of communication with the water-chamber, and a gas-absorbent within such chamber.

8. The combination with a gas-lamp, an acetylene-gas generator comprising a generating-chamber, a water-chamber above the generating-chamber, and a trapped duct leading from the water-chamber to the generating-chamber, and with a valve-controlled duct leading from the generating-chamber to the lamp, of a gas-overflow chamber in communication with the water-chamber above the water-level, and having a vent remote from its means of communication with the water-chamber, transverse baffle-plates extending downwardly from the top of such overflow-chamber, and a gas-absorbent within such chamber.

In testimony whereof I affix my signature in presence of two witnesses.

CHARLES KNOX HARDING.

Witnesses:
W. F. BATES,
LOUIS K. GILLSON.